United States Patent
Jain et al.

(10) Patent No.: US 12,125,128 B2
(45) Date of Patent: Oct. 22, 2024

(54) FREE FORM RADIUS EDITING

(71) Applicant: Adobe Inc., San Jose, CA (US)

(72) Inventors: Arushi Jain, Ashok Vihar (IN); Praveen Kumar Dhanuka, Howrah (IN); Gaurav Jain, Noida (IN)

(73) Assignee: Adobe Inc., San Jose, CA (US)

(*) Notice: Subject to any disclaimer, the term of this patent is extended or adjusted under 35 U.S.C. 154(b) by 498 days.

(21) Appl. No.: 17/363,356

(22) Filed: Jun. 30, 2021

(65) Prior Publication Data

US 2023/0005195 A1    Jan. 5, 2023

(51) Int. Cl.
| | |
|---|---|
| G06K 9/00 | (2022.01) |
| G06F 3/04842 | (2022.01) |
| G06F 3/04845 | (2022.01) |
| G06T 7/13 | (2017.01) |
| G06T 11/20 | (2006.01) |
| G06V 20/62 | (2022.01) |

(52) U.S. Cl.
CPC ........ G06T 11/203 (2013.01); G06F 3/04842 (2013.01); G06F 3/04845 (2013.01); G06T 7/13 (2017.01); G06V 20/62 (2022.01)

(58) Field of Classification Search
CPC ........ G06T 11/203; G06T 11/00; G06T 11/60; G06T 3/00; G06T 7/13; G06T 2207/20164; G06T 2207/00; G06F 3/04845; G06F 3/04842; G06F 3/00; G06K 3/00
See application file for complete search history.

(56) References Cited

U.S. PATENT DOCUMENTS

| | | | | |
|---|---|---|---|---|
| 6,697,080 | B2* | 2/2004 | Trika | G06T 11/203 345/611 |
| 9,147,275 | B1* | 9/2015 | Hyde-Moyer | G06V 30/248 |
| 10,460,483 | B2* | 10/2019 | Sasikumar | G06F 3/0482 |
| 2018/0300852 | A1* | 10/2018 | Chen | G06T 15/20 |

OTHER PUBLICATIONS

Junior, R. M. C., & da Fontoura Costa, L. (1995). Piecewise linear segmentation of digital contours in O (N. Log (N)) through a technique based on effective digital curvature estimation. Real-Time Imaging, 1(6), 409-417. (Year: 1995).*

(Continued)

*Primary Examiner* — Andrew M Moyer
*Assistant Examiner* — Aidan Keup
(74) *Attorney, Agent, or Firm* — FIG. 1 Patents

(57) ABSTRACT

In implementations for free form radius editing, a computing device implements a radius editing system, such as may be integrated with an image editing application. The radius editing system can determine the edge segments for outlines of image objects depicted in a digital image, where the edge segments include corner segments of the image objects. The radius editing system can also determine the radius values of the corner segments of the image objects, and the radius values of the corner segments are maintained in a cache as part of object data corresponding to the image objects depicted in the digital image. The radius editing system can also identify one or more similar corner segments of the image objects that have an equivalent radius value as a selected corner segment responsive to an editing input of a radius of the selected corner segment of an image object.

20 Claims, 9 Drawing Sheets

(56) References Cited

OTHER PUBLICATIONS

Baran, Ilya et al., "Sketching Clothoid Splines Using Shortest Paths", Computer Graphics Forum, vol. 29, No. 2 [retrieved Apr. 14, 2021]. Retrieved from the Internet <http://citeseerx.ist.psu.edu/viewdoc/download?doi=10.1.1.156.3602&rep=rep1&type=pdf>., Jun. 7, 20210, 15 pages.

Enriquez, Ignacio et al., "Bezier Paths : making rectangles with rounded corners", Nacho4d Programming Notes Blog [retrieved Apr. 14, 2021]. Retrieved from the Internet <https://nacho4d-nacho4d.blogspot.com/2011/05/bezier-paths-rounded-corners-rectangles.html>., May 8, 2011, 5 pages.

McCrae, James et al., "Sketching Piecewise Clothoid Curves", SBM'08: Proceedings of the Fifth Eurographics conference on Sketch-Based Interfaces and Modeling [retrieved Apr. 14, 2021]. Retrieved from the Internet <http://diglib.eg.org/bitstream/handle/10.2312/SBM.SBM08.001-008/001-008.pdf?sequence=1&isAllowed=y>., Jun. 2008, 8 pages.

\* cited by examiner

FREE FORM RADIUS EDITING

BACKGROUND

Generally, graphic designers or other similar computer users utilize computer-based image editing and graphics design software applications to develop many different types of digital artworks, such as images that are designed for posters, magazine pages, flyers, book pages, advertisements, and any other type of design documents. Text and other image objects are often incorporated in digital artwork images. For example, text may be added to a digital image to enhance the image and/or to add more context to the visual content of the image. Editing the appearance of text and other image objects depicted in digital images is a very common aspect of developing digital artwork, and more specifically, changing the corner radius of rounded corners of image objects, such as to modify the appearance of text or other shapes displayed in a digital image.

Typically, image editing applications provide that a user can change the corner radius of a corner of an image object depicted in a digital image by dragging an object handle associated with the corner of the image object. Alternatively, and more precisely, a user can utilize the shape options editing for a particular image object by manually setting the drawing constraints for the corner radius of the rounded corners of an image object. However, a graphic designer can incur significant development time and effort to set the rounding radius of multiple rounded corners for the image objects depicted in a digital image, particularly when trying to maintain an overall symmetry of the many edges and corners for multiple image objects in digital artwork.

SUMMARY

This Summary introduces features and concepts of free form radius editing, which is further described below in the Detailed Description and shown in the Figures. This Summary should not be considered to describe essential features of the claimed subject matter, nor used to determine or limit the scope of the claimed subject matter.

Aspects of free form radius editing are described. A computing device implements a radius editing system, which can include various components, such as models, algorithms, and/or modules, configured together to facilitate globally changing the radius of multiple rounded corners of image objects without having to first select and group each corner segment of the image objects that will be subject to the change. Rather than a user of an image editing application having to manually select, analyze, and update the radius value of each individual corner to be changed, the user can simply select one of the corner segments to change the radius, and the similar radius corners of the other image objects can also change and update based on the user resizing the one selected corner segment.

In aspects of free form radius editing, the radius editing system implemented by a computing device can be integrated with an image editing application. Generally, a user interface of the image editing application displays a digital image, which may include text objects and/or shape objects depicted as image objects in the digital image. The user interface of the image editing application can also receive an editing input, such as when initiated by a user of the computing device, to edit the radius of a selected corner segment of an image object.

The radius editing system includes an edge detection module to determine the edge segments for the outlines of the image objects depicted in the digital image. Generally, the edge segments of the outlines of the image objects also include corner segments of the image objects. A corner detection module of the radius editing system can then determine the radius values of the corner segments of the image objects. The determined radius values of the corner segments of the image objects are stored in a cache as part of object data maintained by the system. Additionally, the corner detection module can approximate one or more of the corner segments based on path segments of an image object. In implementations, the approximation of a corner segment includes calculating a piecewise curvature from sample points on the path segments of an image object to define a curvature function of the corner segment.

The radius editing system also includes a radius modification module that utilizes the stored cache of image objects data, which includes the determined radius values, to identify one or more similar corner segments of the image objects having an equivalent radius value as a selected corner segment. For example, a user may initiate an editing input to a selected corner of an image object depicted in a digital image, and responsive to the editing input, the radius modification module identifies one or more similar corner segments of the image objects having an equivalent radius value as the selected corner segment.

In implementations, the radius editing system can initiate to display an enhanced visual indication, such as highlighting, the one or more similar corner segments identified as having the equivalent radius value as the selected corner segment responsive to the editing input. Alternatively or in addition, the radius editing system can also initiate to jointly edit the radius of each of the one or more similar corner segments along with the radius of the selected corner segment responsive to the editing input. Alternatively or in addition, the radius editing system can initiate snapping the radius of the selected corner segment to the equivalent radius value of the one or more similar corner segments responsive to the editing input.

In further aspects of free form radius editing, the image objects depicted in a digital image are text objects of text letters. The edge detection module of the radius editing system can determine the edge segments for the outlines of the text letters, and the corner detection module determines the radius values of the corner segments of the text letters. The radius modification module of the radius editing system can then identify the one or more similar corner segments of the text letters that have an equivalent radius value as a selected corner segment responsive to an editing input of the radius of the selected corner segment. The radius modification module can identify the one or more similar corner segments of the text letters for joint editing the radius of each of the one or more similar corner segments along with the radius of the selected corner segment. Alternatively or in addition, the radius modification module can identify the one or more similar corner segments of the text letters with an enhanced visual indication that the selected corner segment has been edited to match the one or more similar corner segments of the text letters.

BRIEF DESCRIPTION OF THE DRAWINGS

Implementations of free form radius editing are described with reference to the following Figures. The same numbers may be used throughout to reference similar features and components that are shown in the Figures.

DETAILED DESCRIPTION

Figure 1:
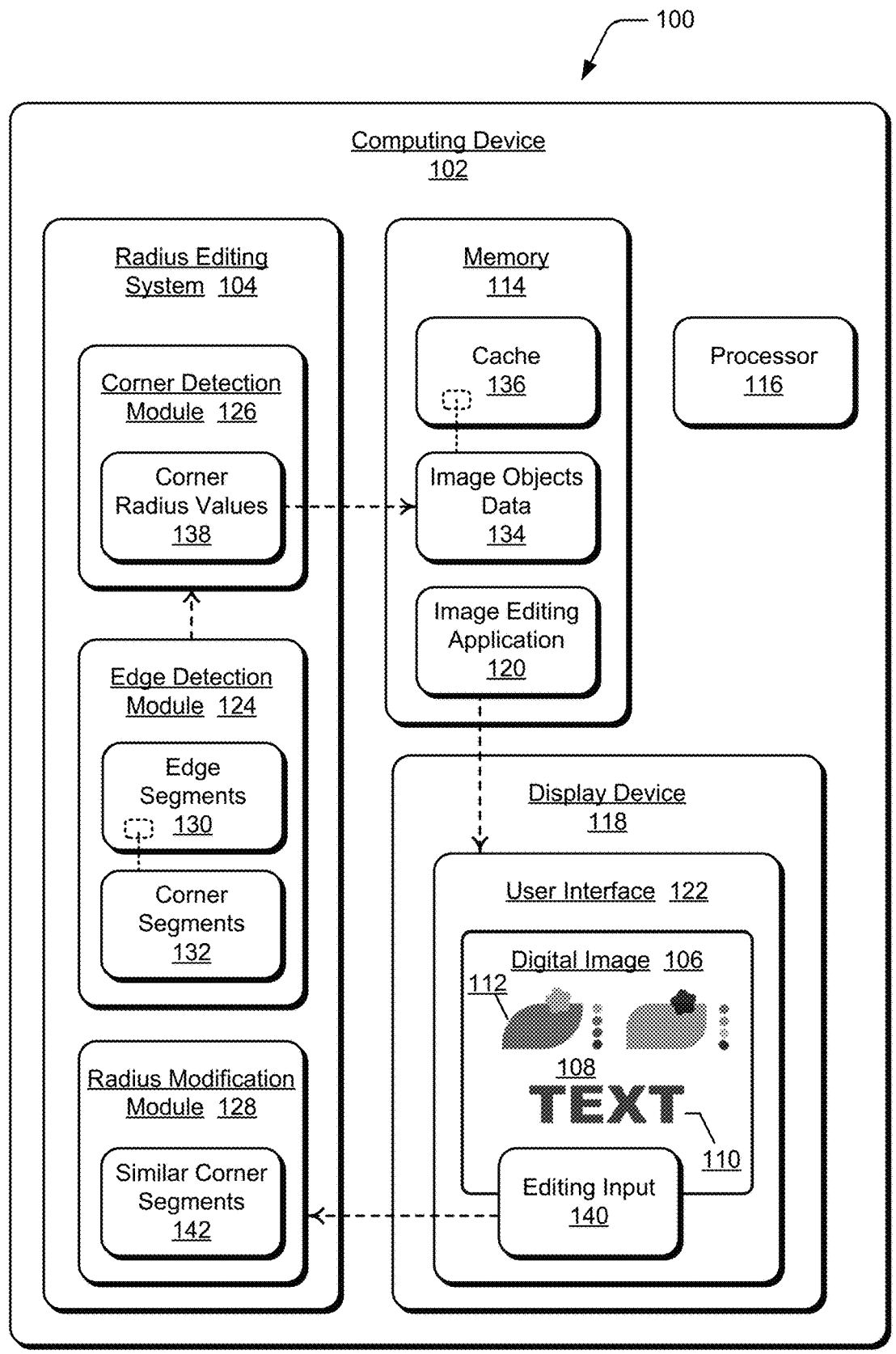
FIG. 1 illustrates an example of a radius editing system and computing device that can implement aspects of the techniques for free form radius editing.

Implementations of free form radius editing are described, and provide techniques to facilitate a user being able to globally change the radius of multiple rounded corners on one or more image objects without the tedious task of having to first select and group each corner segment of the image objects that will be subject to the change. Rather than a user of an image editing application having to manually select, analyze, and update the radius value of each individual corner to be changed, the user can simply select one of the corner segments to change the radius, and the similar radius corners of the other one or more image objects are also updated based on the user resizing the one selected corner segment. This type of simultaneous corner segment editing facilitates a user being able to maintain a synchronous appearance of the corner segments of image objects in digital image artwork, without having to manually update each corner segment individually, as well as maintain appearance consistency between text objects (glyph objects) and shape objects depicted in a digital image.

In implementations, a radius editing system is implemented by a computing device, and the radius editing system can be integrated with an image editing application. A graphic designer working in an image editing application can then utilize aspects of the radius editing system to facilitate editing the corner segments of image objects depicted in a digital image. Generally, a user interface of the image editing application displays a digital image, which can include text objects and/or shape objects depicted as the image objects in the digital image. The user interface of the image editing application can also receive an editing input, such as when initiated by a user of the computing device, to edit the radius of a selected corner segment of an image object.

In conventional image editing and graphics design software applications, constraints are an integral part of the design and drawing tools that are selectable by a user to align, edit, and/or change the overall shapes of image objects depicted in digital image artwork. Some image editing and design applications also allow for editing the attributes of similar looking shapes. However, this feature is limited to an overall global change of image attributes for similar image objects. These constraint and similar attribute editing features do not provide a user of an image editing and design application with the granular option of being able to synchronously edit and resize individual segments of multiple image objects, such as changing the rounding radius of multiple rounded corners for multiple, different image objects depicted in a digital image.

The techniques for free form radius editing include a radius editing system that allows a user to edit a corner segment of an image object with the same radius as that of another existing corner already depicted in the digital image. Notably, a user may want to change all of the rounded corners of a particular radius value, applied to different types of shape objects and/or text objects at some of the corners, for global editing to a new radius value. Generally, a text object is a text letter, also referred to as a glyph, and the radius editing system determines a path object as a vector representation of the edge segments of an outline of a text object depicted in a digital image. Additionally, a shape object is representative of an object or shape depicted in a digital image, and the radius editing system utilizes the path object vectors of the shape object to determine the edge segments of an outline of the shape object.

In aspects of free form radius editing, the radius editing system includes an edge detection module to determine the edge segments for the outlines of the image objects depicted in the digital image. Generally, the edge segments of the outlines of the image objects also include corner segments of the image objects. A corner detection module of the radius editing system can then determine the radius values of the corner segments of the image objects. The determined radius values of the corner segments of the image objects are stored in a cache as part of image objects data maintained by the system. Additionally, the corner detection module can approximate one or more of the corner segments based on path segments of an image object. In implementations, the approximation of a corner segment includes calculating a piecewise curvature from sample points on the path segments of an image object to define a curvature function of the corner segment.

The radius editing system also includes a radius modification module that utilizes the stored cache of image objects data, which includes the determined radius values, to identify one or more similar corner segments of the image objects having an equivalent radius value as a selected corner segment. For example, a user may initiate an editing input to a selected corner of an image object depicted in a digital image, and responsive to the editing input, the radius modification module identifies one or more similar corner segments of the image objects having an equivalent radius value as the selected corner segment.

In implementations, the radius editing system can initiate to display an enhanced visual indication, such as highlighting, the one or more similar corner segments identified as having the equivalent radius value as the selected corner segment responsive to the editing input. Alternatively or in addition, the radius editing system can also initiate to jointly edit the radius of each of the one or more similar corner segments along with the radius of the selected corner segment responsive to the editing input. Alternatively or in addition, the radius editing system can initiate snapping the radius of the selected corner segment to the equivalent radius value of the one or more similar corner segments responsive to the editing input.

In further aspects of free form radius editing, the image objects depicted in a digital image are text objects of text letters. The edge detection module of the radius editing system can determine the edge segments for the outlines of the text letters, and the corner detection module determines the radius values of the corner segments of the text letters. Notably, the edge detection module can determine the edge segments for the outlines of the text letters without converting the text letters into path outlines, thereby maintaining the glyph features of the text letters, such as font type and font size. A graphic designer can easily synchronize the appearance of rounded corners across different image objects depicted in digital image artwork, and for glyphs of text letters in different fonts, maintain intact the typographic properties of the text letters.

The radius modification module of the radius editing system can then identify the one or more similar corner segments of the text letters that have an equivalent radius value as a selected corner segment responsive to an editing input of the radius of the selected corner segment. The radius modification module can identify the one or more similar corner segments of the text letters for joint editing the radius of each of the one or more similar corner segments along with the radius of the selected corner segment. Alternatively or in addition, the radius modification module can identify the one or more similar corner segments of the text letters with an enhanced visual indication, such as highlighting, to indicate that the selected corner segment has been edited to match the one or more similar corner segments of the text letters.

While features and concepts of free form radius editing can be implemented in any number of different devices, systems, networks, environments, and/or configurations, implementations of free form radius editing are described in the context of the following example devices, systems, and methods.

FIG. 1 illustrates an example 100 of a computing device 102 that can implement aspects of the techniques for free form radius editing, as described herein. The computing device 102 implements features of a radius editing system 104 for free form radius editing of corner segments of image objects depicted in a digital image 106. For example, a digital image 106 can include image objects 108, which may be text objects 110 and/or shape objects 112 depicted in the image. Generally, a text object 110 is a text letter, also commonly referred to as a glyph, and the radius editing system 104 determines a path object as a vector representation of the edge segments of an outline of a text object depicted in a digital image. Additionally, a shape object 112 is representative of an object or shape depicted in a digital image, and the radius editing system 104 utilizes the path object vectors of the shape object to determine the edge segments of an outline of the shape object. As further described in detail below, the radius editing system 104 can then determine which of the edge segments of the outlines are corner segments of the text objects and shape objects, and then determine the radius values of each of the corner segments.

In this example, the computing device 102 may be any type of consumer electronic device, computing device, client device, tablet device, mobile device, wireless device, and/or any other type of electronic, computing, and/or communication device. The computing device 102 can also be implemented with various components, such as any number and combination of different components as further described with reference to the example device shown in FIG. 9. Generally, the computing device 102 includes a memory 114 and a processor 116, as well as a display device 118 on which digital images and content can be displayed in application user interfaces.

In this example 100, the computing device 102 includes an image editing application 120, which a designer may use to graphically edit, design, and/or enhance digital images and artwork, such as the digital image 106, which displays in a user interface 122 of the image editing application 120 on the display device 118 of the computing device. The image editing application 120 is an example of any type of a computer-based image editing and graphics design software application that a designer (e.g., computing device user) may use to edit and design digital images and graphics, such as the digital image 106.

The computing device 102 implements the radius editing system 104, which can be implemented as one or more modules that may include independent processing, memory, and/or logic components functioning as a computing and/or electronic device integrated with the computing device. Alternatively or in addition, the radius editing system 104 can be implemented in software, in hardware, or as a combination of software and hardware components. In this example 100, the radius editing system 104 is integrated with the image editing application 120, and is implemented as components or modules of a software application, such as executable software instructions (e.g., computer-executable instructions) that are executable with a processing system (e.g., the processor 116, a graphics processor, and the like) of the computing device 102 to implement aspects of the described techniques for free form radius editing.

As components or modules of a software application, the radius editing system 104 can be stored in memory of the device (e.g., in the device memory 114), or in any other suitable memory device or electronic data storage implemented with the radius editing system. Alternatively or in addition, the radius editing system 104 may be implemented in firmware and/or at least partially in computer hardware. For example, at least part of the radius editing system 104 may be executable by a computer processor, and/or at least part of the radius editing system may be implemented in logic circuitry.

In implementations, the radius editing system 104 includes an edge detection module 124, a corner detection module 126, and a radius modification module 128. The edge detection module 124 is implemented in the radius editing system 104 to determine the edge segments 130 for the outlines of the image objects 108 depicted in the digital image 106. The edge segments 130 also include corner segments 132 of the outline boundaries of the image objects 108, and the edge detection module 124 can determine and identify the corner segments. Generally, the edge detection module 124 can implement any type of known procedure or algorithm to determine the rounded corner segments 132, given the vector inputs of the boundary outlines of the image objects 108. The identified corner segments 132 of the outlines of the image objects 108 can be stored as part of the image objects data 134 in a cache 136 in the device memory 114. The image objects data 134 stored in the cache 136 correlates the corner segments 132 with identifiers of the respective image objects 108 depicted in the digital image 106 for subsequent reference. These features of the cache 136 and the image objects data 134 are further shown and described below with reference to FIG. 2.

Additionally, the corner detection module 126 is implemented in the radius editing system 104 to determine the corner radius values 138 of each of the corner segments 132 of the image objects 108, and the corner radius values 138 are also stored as part of the image objects data 134 in the cache 136. Notably, the edge detection module 124 and/or the corner detection module 126 can also be implemented with a procedure or algorithm to approximate the rounded corner segments 132 of the image objects 108 depicted in the digital image 106. Generally, some rounded corners of the image objects 108 depicted in digital images may not be actual rounded corners, but rather consecutive segment lines that appear as a single corner segment of some defined radius. In implementations, the corner detection module 126 can approximate one or more of the corner segments based on the path segments of an image object, where the approximation of a corner segment includes calculating a piecewise curvature from sample points on the path segments of the image object to define a curvature function of the corner segment.

The radius editing system 104 can implement an approximation algorithm integrated with the edge detection module 124 and/or the corner detection module 126 to calculate approximate rounded corner segments. For example, the input Bezier geometry of the edge segments 130 is sampled and the curvature at each sample point is calculated using an approximation method as described and detailed in the document "Sketching Piecewise Clothoid Curves" by J. McCrae (In *Proceedings of the Fifth Eurographics Conference on Sketch-Based Interfaces and Modeling*, SBM'08, page 1-8, Goslar, D E U, 2008. Eurographics Association), which is incorporated by reference herein. A curvature function is defined at each sample point of a corner segment 132, and to generate a constant curvature, the horizontal or vertical linear line is defined at each sample point, over which primitives can be fitted as described and detailed in the document "Sketching Clothoid Splines using Shortest Paths by I. Baran (*Computer Graphics Forum*, 29:655-664, 05 2010), which is incorporated by reference herein. The lines can then be filtered out after fitting, which provides the segments corresponding to the approximated rounded corners along with the approximated curvature information of the corner segments 132.

As indicated above, the cache 136 maintains the image objects data 134, which includes the corner segments 132, each uniquely identified and corresponding to the respective image objects 108 depicted in the digital image 106, as well as the determined corner radius values 138 of each of the corner segments. Given the snapping and visual indication hinting (e.g., highlighting) features described herein with reference to free form radius editing, a dynamic corner segment tolerance is defined for the cache entries (e.g., the image objects data 134), and to incorporate the tolerance, the floating range is divided into buckets $[0, \varepsilon], [\varepsilon, 2\varepsilon] \ldots$. For performant snapping and highlighting, the image objects data 134 is cached efficiently as an ordered hash between the corner radius values 138 and the corner segments information, which includes the Bezier segments information corresponding to a particular corner segment 132.

The radius modification module 128 of the radius editing system 104 can receive an editing input 140, via the user interface 122 of the image editing application 120, to edit the radius of a selected corner segment of one of the image objects 108 depicted in the digital image 106 that is displayed in the user interface 122 on the display device 118 of the computing device 102. For example, a user may select the corner of a text letter to resize the radius of the corner segment 132, such as with a mouse, a stylus, by touch control, and/or by any other editing input technique on the user interface. The radius modification module 128 of the radius editing system 104, which is integrated with the image editing application 120, can receive the editing input 140. The radius modification module 128 can then identify one or more similar corner segments 142 of the image objects 108 that have an equivalent radius value as the selected corner segment responsive to the editing input 140 to the radius of the selected corner segment of the image object.

The radius modification module 128 can identify the one or more similar corner segments 142 of the image objects 108 from the image objects data 134 maintained in the cache 136 in the device memory 114. In aspects of the described features for free form radius editing, the similar corner segments 142 can be highlighted for display on the digital image 106 in the user interface 122. For example, the radius modification module 128 is implemented to initiate an enhanced visual indication, such as highlighting, the one or more similar corner segments 142 identified as having an equivalent radius value as the selected corner segment responsive to the editing input 140 from the user.

Alternatively or in addition, the similar corner segments 142 can be jointly edited along with the selected corner segment responsive to the editing input 140. For example, the radius modification module 128 is implemented to initiate jointly editing the radius of each of the one or more similar corner segments 142 along with the radius of the selected corner segment responsive to the editing input 140. Alternatively or in addition, the selected corner segment of the editing input 140 can snap to the radius setting or value of the similar corner segments 142. For example, the radius modification module 128 is implemented to initiate snapping the radius of the selected corner segment to the equivalent radius value of the one or more similar corner segments 142 responsive to the editing input. These highlight, snapping, and joint editing features are further shown and described below with reference to FIGS. 2-6.

Figure 2:
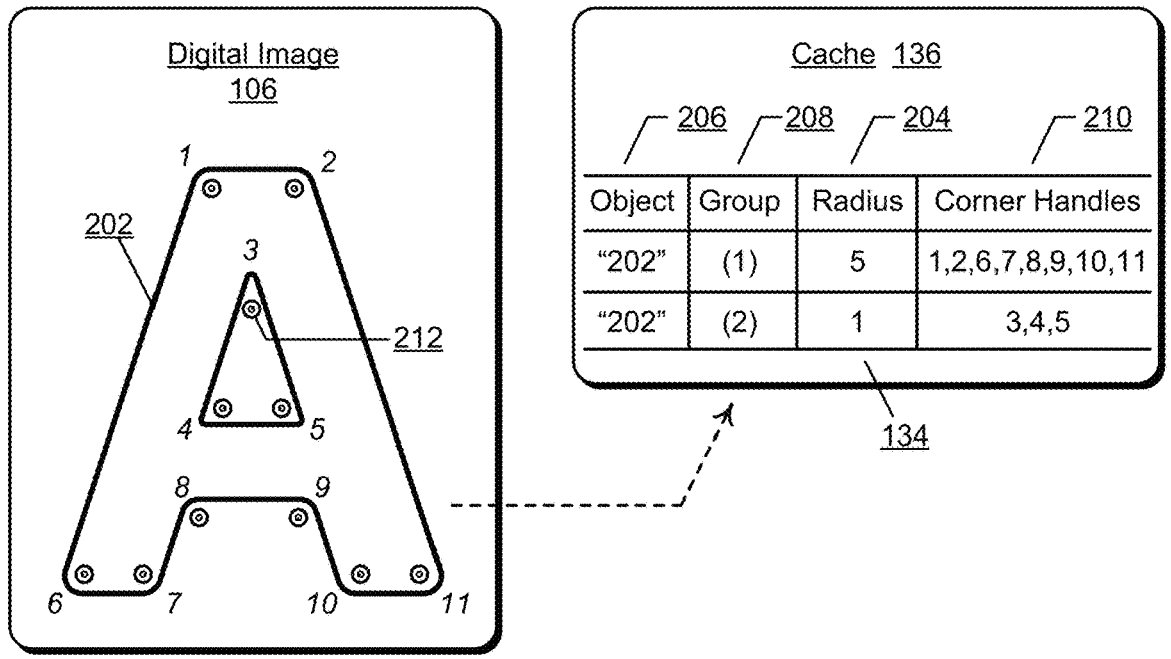
FIG. 2 further illustrates examples of features of the radius editing system implemented for free form radius editing of a text object, as described herein.
Figure 2:
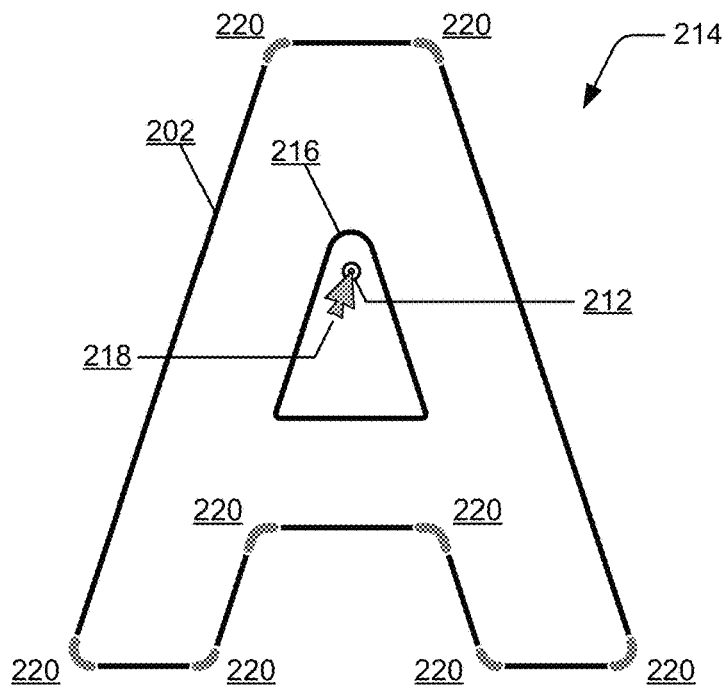

FIG. 2 further illustrates examples 200 of the features implemented by the radius editing system 104, as shown and described with reference to FIG. 1. For example, an image object is depicted in a digital image 106, such as would be displayed in the user interface 122 on the display device 118 of the computing device 102. In this example, the image object depicted in the digital image 106 is a text object, shown as a text letter 202 (i.e., the text letter "A"), which is also commonly referred to as a glyph. It should be noted that, although the text objects 110 are shown and discussed herein as text letters, the techniques described for free form radius editing are applicable to any shape objects, as well as text objects that are depicted in a digital image 106 as numbers. Accordingly, text objects referred to herein encompasses numbers, text letters, and any other type of glyphs and fonts.

An example of the cache 136 described with reference to FIG. 1 is also shown, including at least part of the image objects data 134 corresponding to the text letter 202 that is maintained in the cache 136 in the device memory 114 of the computing device 102. The text letter 202 has multiple corner segments, of two different corner radius values, listed in the cache data as radius values 204 of radius "5" and radius "1" simply for discussion. The image objects data 134 corresponding to the text letter 202 and maintained in the cache includes an image object identifier 206 of the text letter, radius grouping identifiers 208, the radius values 204 of the corner segments 132 in a respective radius grouping, and corner handle identifiers 210 of each of the corner segments 132 in a respective radius grouping. Notably, the corner handle identifiers 210 shown in the digital image (i.e., the identifiers numbered 1-11) would not typically be displayed, but are shown in this example simply for discussion purposes. However, the corner handles for editing the corner segments 132 of the text letter 202 are displayed in the digital image when the image object is selected for editing, such as the corner handle 212 that a user can manipulate to edit the radius of the corner segment corresponding to the corner handle identifier number three (3).

As further illustrated at 214, a user can initiate an editing input to resize the radius of a selected corner segment 216 of the text letter 202, such as with a pointing device 218 to click-select and drag the corner handle 212, which resizes the radius of the selected corner segment 216 of the text letter. As the resizing of the radius of the selected corner segment 216 increases from the initial radius value of one (1) and approaches the radius value of five (5), the radius modification module 128 can initiate snapping the radius of the selected corner segment 216 to the equivalent radius value of the other similar corner segments 220 of the text letter 202 responsive to the editing input. The efficiencies of the cache 136 provide for a highly performant radius edit process and keeps the entire edit resizing session very smooth and fluent.

The radius modification module 128 can identify the similar corner segments 220 of the text letter 202 (e.g., a text object) that have an equivalent radius value as the selected corner segment 216 from the image objects data 134 maintained in the cache 136. Additionally, the similar corner segments 220 can be highlighted for display on the digital image 106 in the user interface 122. The radius modification module 128 is implemented to initiate an enhanced visual indication, such as highlighting, the similar corner segments 220 identified as having an equivalent radius value as the selected corner segment 216 responsive to the editing input from the user.

For example, the selected corner segment 216 is resized to the radius value of five (5) based on the editing input. Accordingly, the similar corner segments 220 (also identified by the corner handle identifiers numbered 1, 2, and 6-11), are all highlighted to indicate the similar corner segments having the same radius value as the selected corner segment. Although the similar corner segments 220 are all shown as highlighted in this illustrated example, the radius modification module 128 can initiate any type of enhanced visual indication of the similar corner segments, such as with dashed lines, different colors, bolder lines, and/or any other type of visual enhancements.

Figure 3:
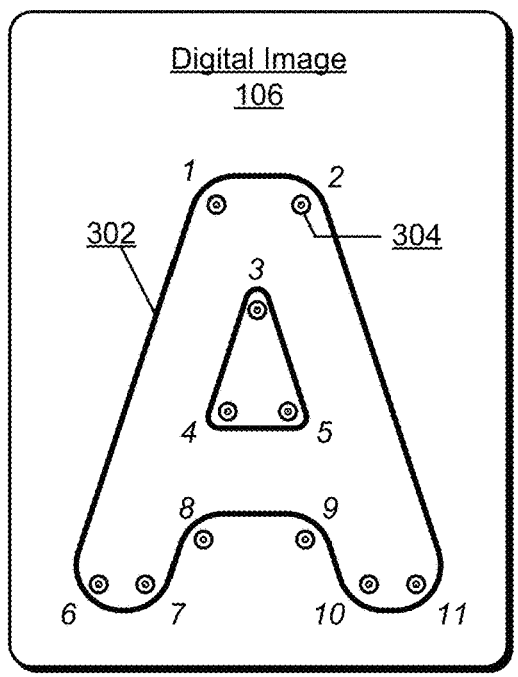
FIG. 3 further illustrates examples of features of the radius editing system implemented for free form radius editing of a text object, as described herein.
Figure 3:
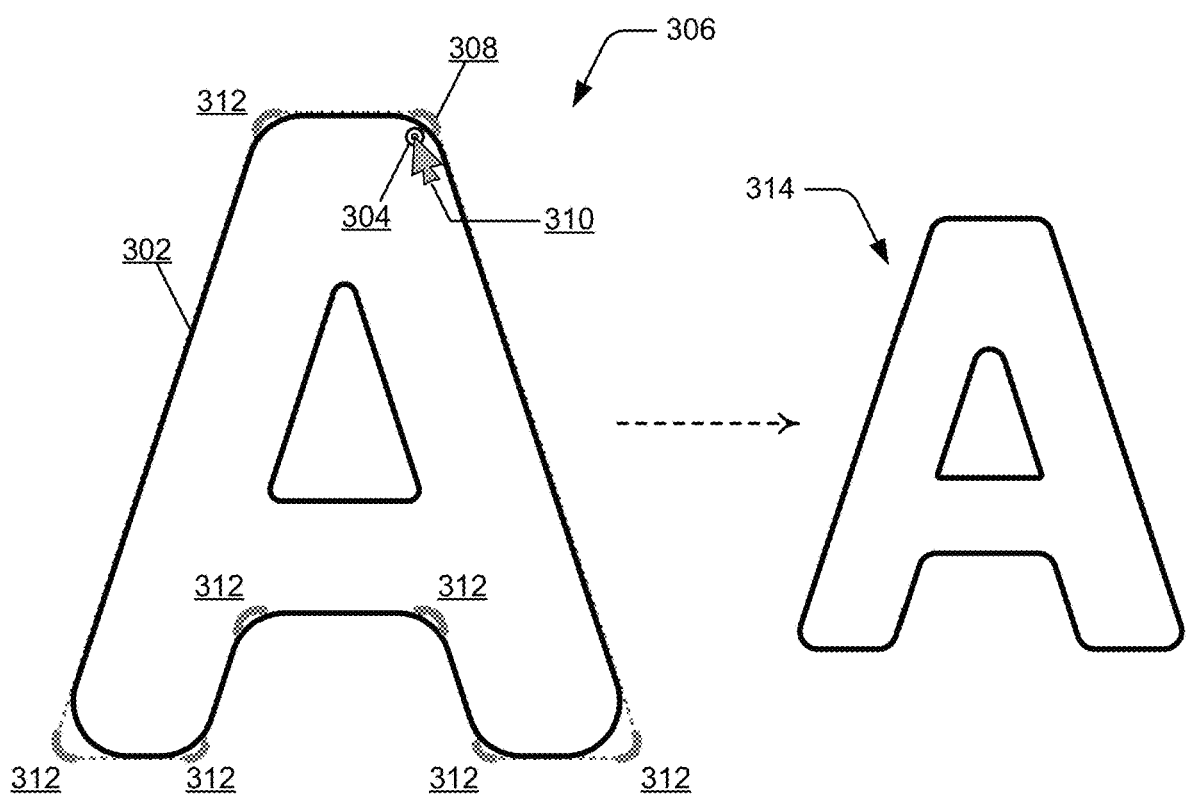

FIG. 3 further illustrates examples 300 of the features implemented by the radius editing system 104, as shown and described with reference to FIGS. 1 and 2. For example, an image object is depicted in a digital image 106, such as would be displayed in the user interface 122 on the display device 118 of the computing device 102. In this example, the image object depicted in the digital image 106 is a text object, shown as a text letter 302 (i.e., the text letter "A"). Notably, the corner segments of the text letter 302 have larger radius values than the corner segments of the text letter 202 shown and described with reference to FIG. 2. The corner handles for editing the corner segments of the text letter 302 are also displayed in the digital image 106, such as the corner handle 304 that a user can manipulate to edit the radius of the corner segment corresponding to the corner handle identifier number two (2).

In this example, interactive free form editing of similar looking rounded corner segments of image objects depicted in the digital image 106 are jointly edited to preserve the visual consistency and coherency of the image objects appearance. As further illustrated at 306, a user can initiate an editing input to resize the radius of a selected corner segment 308 of the text letter 302, such as with a pointing device 310 to click-select and drag the corner handle 304, which resizes the radius of the selected corner segment 308 of the text letter 302.

The radius modification module 128 can identify the similar corner segments of the text letter 302 (e.g., a text object) that have an equivalent radius value as the selected corner segment 308 from the image objects data 134 maintained in the cache 136. Additionally, the similar corner segments can be highlighted for display on the digital image 106 in the user interface 122 responsive to the editing input from the user. For example, the selected corner segment 308 is subject to an editing input, and the similar corner segments (identified by the corner handle identifiers numbered 1 and 6-11), are all highlighted to indicate the similar corner segments having the same radius value as the selected corner segment.

Additionally, the similar corner segments of the text letter 302 can be jointly edited along with the selected corner segment 308. As shown at 314, the radius modification module 128 is implemented to jointly edit the radius of each of the similar corner segments 312 along with the radius of the selected corner segment 308 responsive to the editing input, which maintains the appearance consistency of the displayed text letter. Notably, the user may also deselect any of the similar corner segments which the user chooses not to subject to the editing input.

In the described aspects of free form radius editing, the radius modification module 128 can initiate to highlight the similar corner segments of one or more image objects depicted in a digital image, and then jointly edit the similar corner segments along with the selected corner segment. Further, as described above, the radius modification module 128 can initiate snapping the radius of the selected corner segment to the equivalent radius value of the similar corner segments of one or more image objects depicted in a digital image, and also highlight the similar corner segments of the one or more image objects. In implementations, the user interface 122 of the image editing application 120 may include a user-selectable toggle by which a user can select any one or combination of the highlight, snapping, and joint editing features of free form radius editing.

Figure 4:
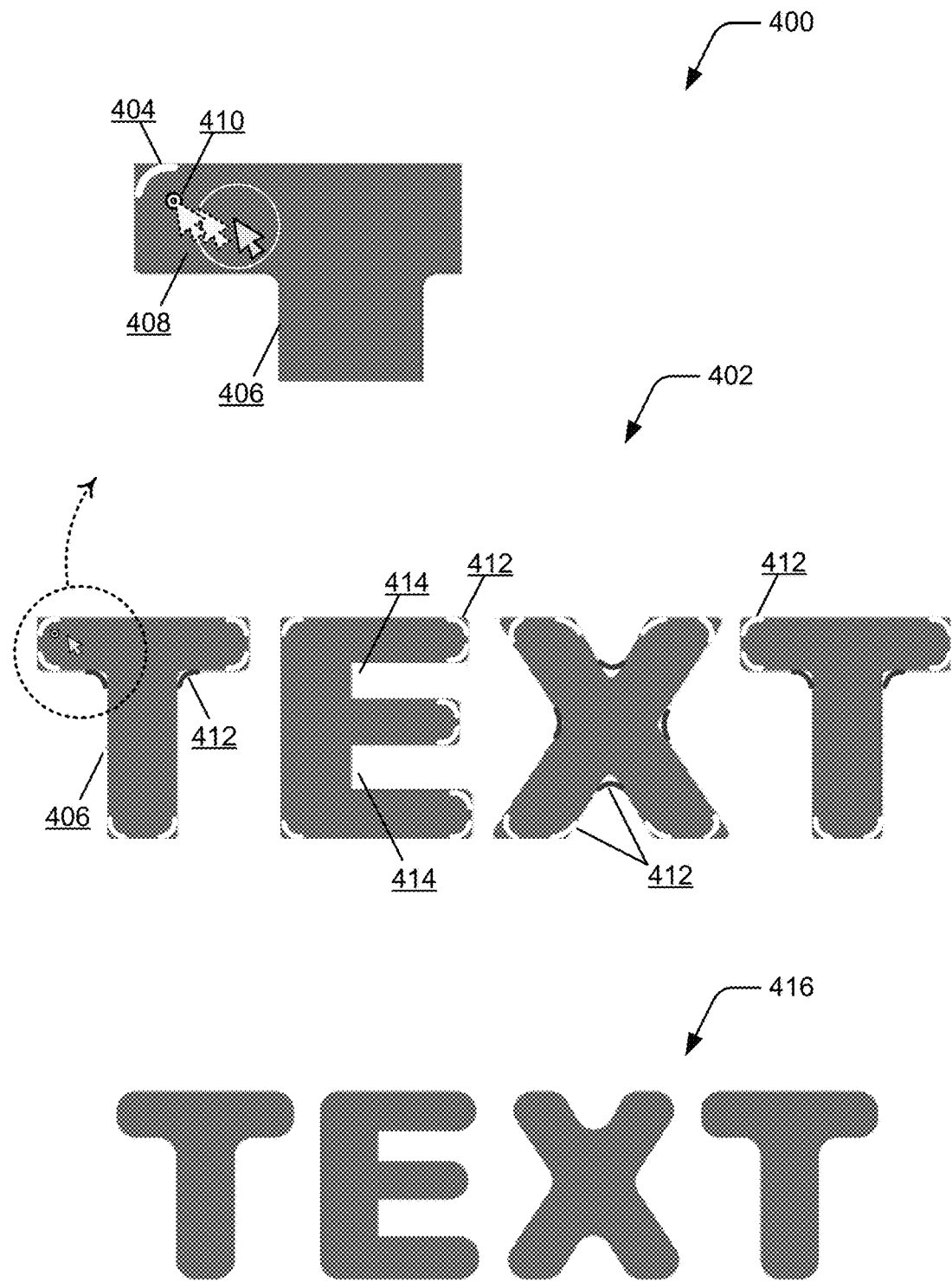
FIG. 4 further illustrates examples of features of the radius editing system implemented for free form radius editing of text objects as text letters, as described herein.

FIG. 4 further illustrates examples 400 of the features implemented by the radius editing system 104, as shown and described with reference to FIG. 1. For example, text objects 402 may be depicted in a digital image 106 as displayed in the user interface 122 on the display device 118 of the computing device 102. In this example, the individual text objects 402 each correspond to the respective text letters "T", "E", "X", and "T", which are glyphs of the text letters. The similar corner segments of the text objects 402 can be jointly edited to preserve the visual consistency and coherency of the text objects appearance. As illustrated, a user can initiate an editing input to resize the radius of a selected corner segment 404 of the text letter 406, such as with a pointing device 408 to click-select and drag a corner handle 410 that is associated with the selected corner segment.

The radius modification module 128 can identify the similar corner segments 412 of all the text objects 402 that have an equivalent radius value as the selected corner segment 404 from the image objects data 134 maintained in the cache 136. In this example, the text letter "E" also has corner segments 414 that do not have a similar radius value as the selected corner segment 404. The radius modification module 128 can initiate the enhanced visual indication (e.g., highlighting) of the similar corner segments 412 of the text objects 402. Further, as the radius of the selected corner segment 404 of the text letter 406 is resized responsive to the editing input, the radius modification module 128 is implemented to jointly edit the radius of each of the similar corner segments 412 along with the radius of the selected corner segment. Notably, the corner segments 414 of the text letter "E" that do not have the similar radius value as the selected corner segment 404 are not edited, as shown in the modified and jointly edited letters "T E X T" at 416.

Figure 5:
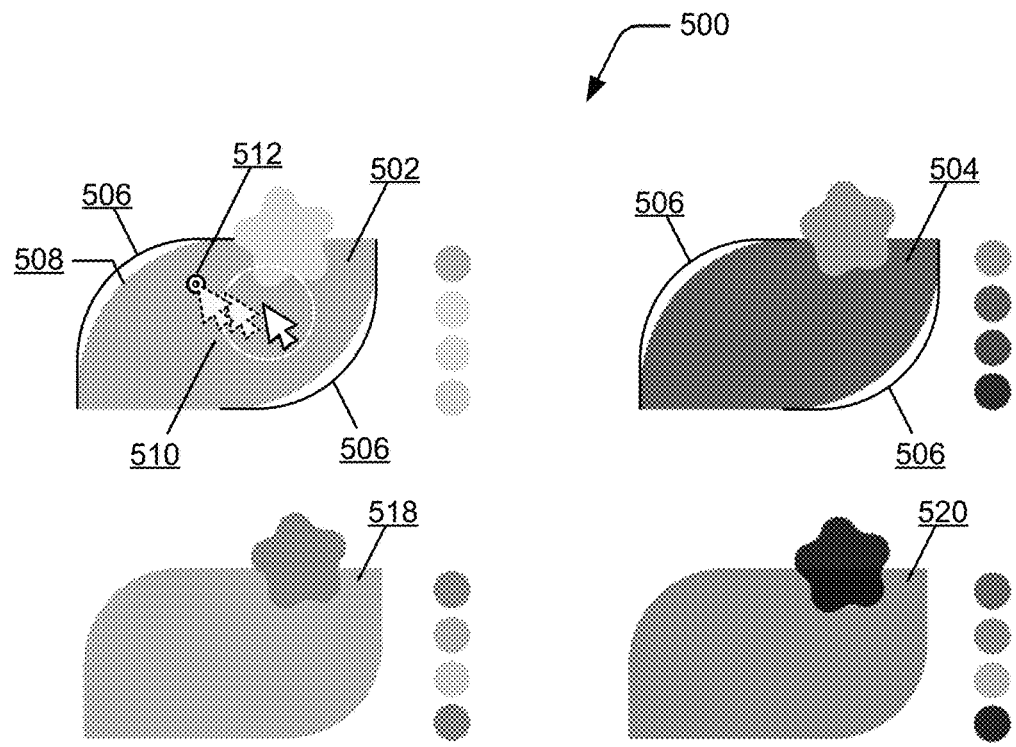
FIG. 5 further illustrates examples of features of the radius editing system implemented for free form radius editing of shape objects, as described herein.
Figure 5:
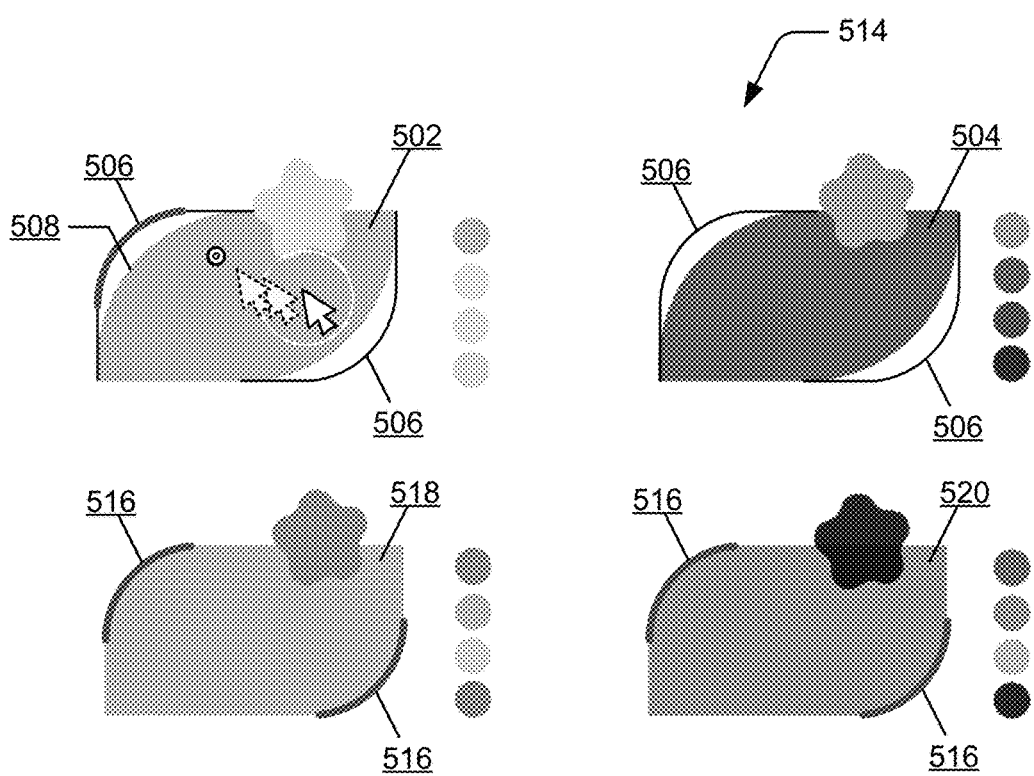

FIG. 5 further illustrates examples 500 of the features implemented by the radius editing system 104, as shown and described with reference to FIG. 1. For example, several shape objects may be depicted in a digital image 106 as displayed in the user interface 122 on the display device 118 of the computing device 102. In this example, the individual shape objects 502, 504 have similar corner segments 506 with equal radius values. The similar corner segments 506 of the shape objects 502, 504 can be jointly edited to preserve the visual consistency and coherency of the shape objects appearance. As illustrated, a user can initiate an editing input to resize the radius of a selected corner segment 508 of the shape object 502, such as with a pointing device 510 to click-select and drag a corner handle 512 that is associated with the selected corner segment.

The radius modification module 128 can identify the similar corner segments 506 of all the shape objects that have an equivalent radius value as the selected corner segment 508 from the image objects data 134 maintained in the cache 136. In this example, the shape objects 502, 504 have the corner segments 506 that are of a similar radius value as the selected corner segment 508. The radius modification module 128 can initiate the enhanced visual indication (e.g., highlighting) of the similar corner segments 506 of the shape objects 502, 504. Further, as the radius of the selected corner segment 508 of the shape object 502 is resized responsive to the editing input, and the radius modification module 128 is implemented to jointly edit the radius of each of the similar corner segments 506 along with the radius of the selected corner segment.

Further, as shown at 514, the radius of the selected corner segment 508 of the shape object 502 continues to be resized responsive to the editing input, and the radius modification module 128 is implemented to snap the selected corner segment 508 to the radius value of the other similar corner segments 516 of the shape objects 518, 520. The radius modification module 128 can also initiate the enhanced visual indication (e.g., highlighting) of the similar corner segments 516 of the shape objects 518, 520 along with the selected corner segment 508 of the shape object 502.

Figure 6:
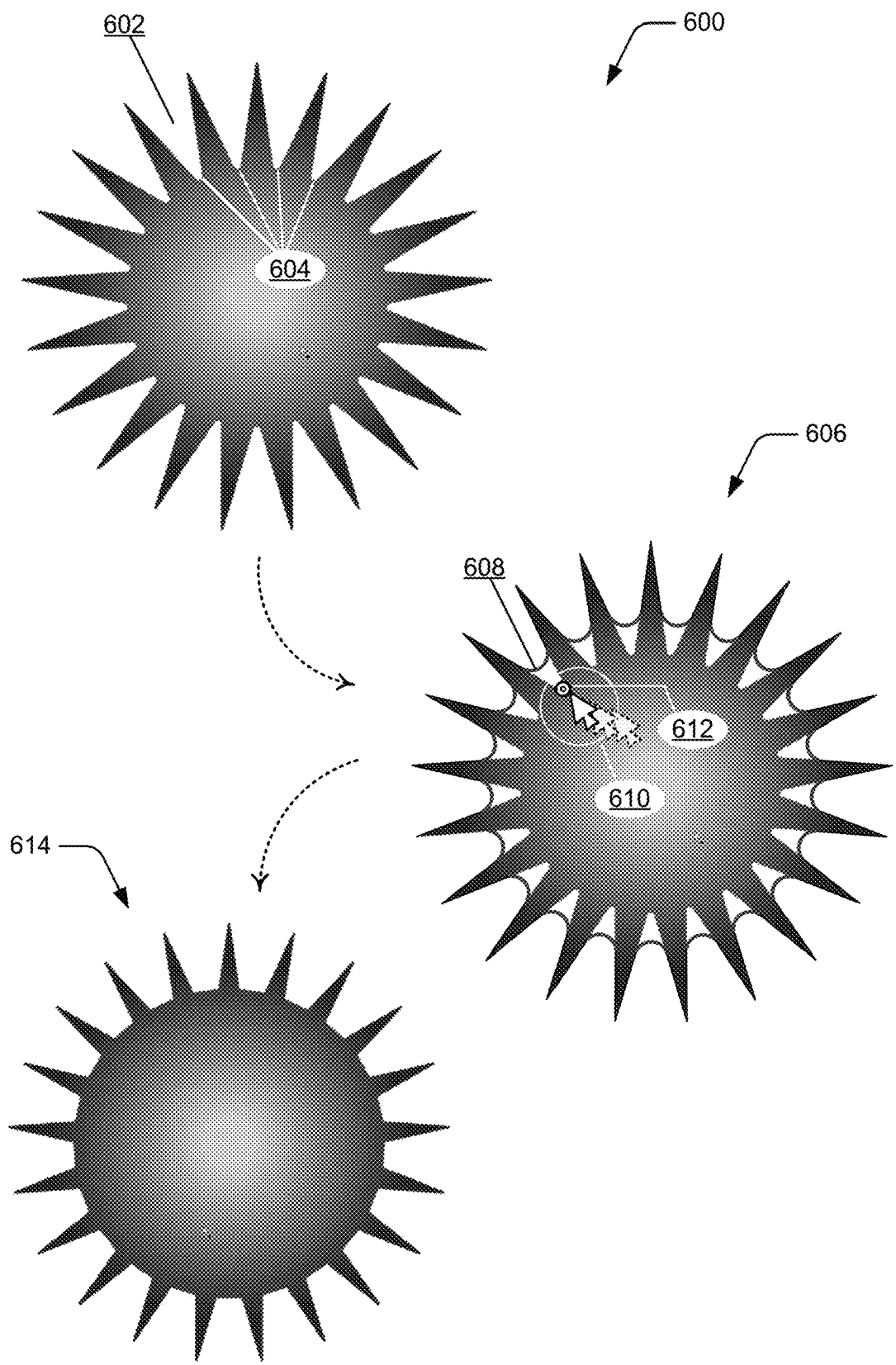
FIG. 6 further illustrates examples of features of the radius editing system implemented for free form radius editing of a pattern of a shape object, as described herein.

FIG. 6 further illustrates examples 600 of the features implemented by the radius editing system 104, as shown and described with reference to FIG. 1. For example, a shape object 602 with a pattern may be depicted in a digital image 106 as displayed in the user interface 122 on the display device 118 of the computing device 102. In this example, the shape object 602 has a pattern of similar corner segments 604 with equal radius values, and the similar corner segments of the pattern of the shape object can be jointly edited to preserve the visual consistency and coherency of the pattern appearance. As illustrated at 606, a user can initiate an editing input to resize the radius of a selected corner segment 608 of the shape object 602, such as with a pointing device 610 to click-select and drag a corner handle 612 that is associated with the selected corner segment.

The radius modification module 128 can identify the similar corner segments 604 of the pattern of the shape object 602 that have an equivalent radius value as the selected corner segment 608 from the image objects data 134 maintained in the cache 136. The radius modification module 128 can then initiate to jointly edit the radius of each of the similar corner segments 604 along with the radius of the selected corner segment 608 as the radius of the selected corner segment of the pattern of the shape object 602 is resized responsive to the editing input. The pattern of the shape object 602 is modified as shown at 614 responsive to the editing input and the joint editing of the similar corner segments 604.

Example methods 700 and 800 are described with reference to respective FIGS. 7 and 8 in accordance with one or more aspects of free form radius editing. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
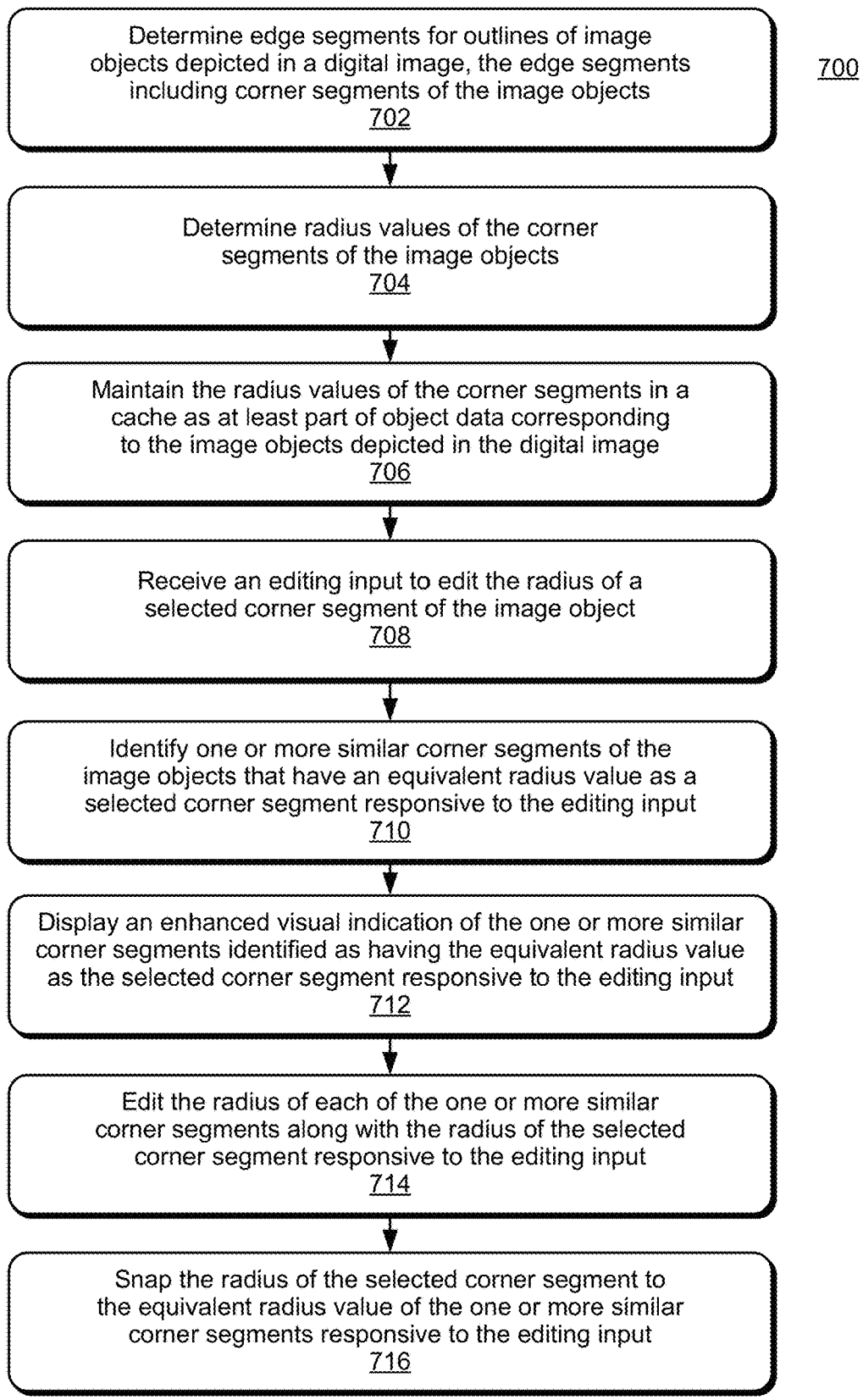
FIG. 7 illustrates example methods of free form radius editing in accordance with one or more implementations.

FIG. 7 illustrates example method(s) 700 for free form radius editing, and is generally described with reference to the radius editing system implemented by a computing device as shown and described with reference to FIGS. 1-6. The order in which the method is described is not intended to be construed as a limitation, and any number or combination of the method operations can be combined in any order to implement a method, or an alternate method.

At 702, edge segments are determined for outlines of image objects depicted in a digital image, the edge segments including corner segments of the image objects. For example, the edge detection module 124 implemented in the radius editing system 104 determines the edge segments 130 for the outlines of the image objects 108 depicted in the digital image 106. The edge segments 130 also include the corner segments 132 of the outline boundaries of the image objects 108, and the edge detection module 124 determines and identifies the corner segments. Generally, the image objects 108 may be text objects 110 of text letters and/or shape objects 112 depicted in the digital image 106. The corner detection module 126 can also approximate the rounded corner segments 132 of the image objects 108 depicted in the digital image 106 for the corner segments that are not actual rounded corners. In implementations, the corner detection module 126 approximates one or more of the corner segments 132 based on path segments of an image object, where the approximation of a corner segment includes calculating a piecewise curvature from sample points on the path segments to define a curvature function of the corner segment.

At 704, radius values of the corner segments of the image objects are determined. For example, the corner detection module 126 implemented in the radius editing system 104 determines the corner radius values 138 of each of the corner segments 132 of the image objects 108. At 706, the radius values of the corner segments are maintained in a cache as at least part of object data corresponding to the image objects depicted in the digital image. For example, the cache 136 maintains the image objects data 134, which includes the corner segments 132, each uniquely identified and corresponding to the respective image objects 108 depicted in the digital image 106, as well as the determined corner radius values 138 of each of the corner segments.

At 708, an editing input is received to edit the radius of a selected corner segment of the image object. For example, the radius modification module 128 of the radius editing system 104 receives an editing input 140 to edit the radius of a selected corner segment of one of the image objects 108 depicted in the digital image 106 that is displayed in the user interface 122 on the display device 118 of the computing device 102. A user may select the corner of a text letter to resize the radius of the corner segment 132, such as with a mouse, a stylus, by touch control, and/or by any other editing input technique on the user interface. The radius modification module 128 of the radius editing system 104, which is integrated with the image editing application 120, receives the editing input 140.

At 710, one or more similar corner segments of the image objects are identified that have an equivalent radius value as a selected corner segment responsive to the editing input. For example, the radius modification module 128 of the radius editing system 104 identifies one or more similar corner segments 142 of the image objects 108 that have an equivalent radius value as the selected corner segment responsive to the editing input 140 to the radius of the selected corner segment of the image object. The radius modification module 128 identifies the one or more similar corner segments 142 of the image objects 108 from the image objects data 134 maintained in the cache 136 in the device memory 114.

At 712, an enhanced visual indication of the one or more similar corner segments identified as having the equivalent radius value as the selected corner segment are displayed responsive to the editing input. For example, the similar corner segments 142 are highlighted for display on the digital image 106 in the user interface 122. The radius modification module 128 of the radius editing system 104 initiates an enhanced visual indication, such as highlighting, the one or more similar corner segments 142 identified as having an equivalent radius value as the selected corner segment responsive to the editing input 140 from the user.

At 714, the radius of each of the one or more similar corner segments are edited along with the radius of the selected corner segment responsive to the editing input. For example, the similar corner segments 142 are jointly edited along with the selected corner segment responsive to the editing input 140. The radius modification module 128 of the radius editing system 104 initiates joint editing the radius of each of the one or more similar corner segments 142 along with the radius of the selected corner segment responsive to the editing input.

At 716, the radius of the selected corner segment is snapped to the equivalent radius value of the one or more similar corner segments responsive to the editing input. For example, the selected corner segment of the editing input 140 snaps to the radius setting or value of the similar corner segments 142. The radius modification module 128 of the radius editing system 104 initiates snapping the radius of the selected corner segment to the equivalent radius value of the one or more similar corner segments 142 responsive to the editing input. Notably, the highlight, snapping, and/or joint editing features can be implemented independently or together in any combination.

In described aspects of free form radius editing, the radius modification module 128 initiates to highlight the similar corner segments of one or more image objects depicted in a digital image, and then jointly edits the similar corner segments along with the selected corner segment. Further, as described above, the radius modification module 128 initiates snapping the radius of the selected corner segment to the equivalent radius value of the similar corner segments of one or more image objects depicted in a digital image, and also highlights the similar corner segments of one or more image objects. In implementations, the user interface 122 of the image editing application 120 may include a user-selectable toggle by which a user can select any one or combination of the highlighting, snapping, and joint editing features of free form radius editing, as described herein.

Figure 8:
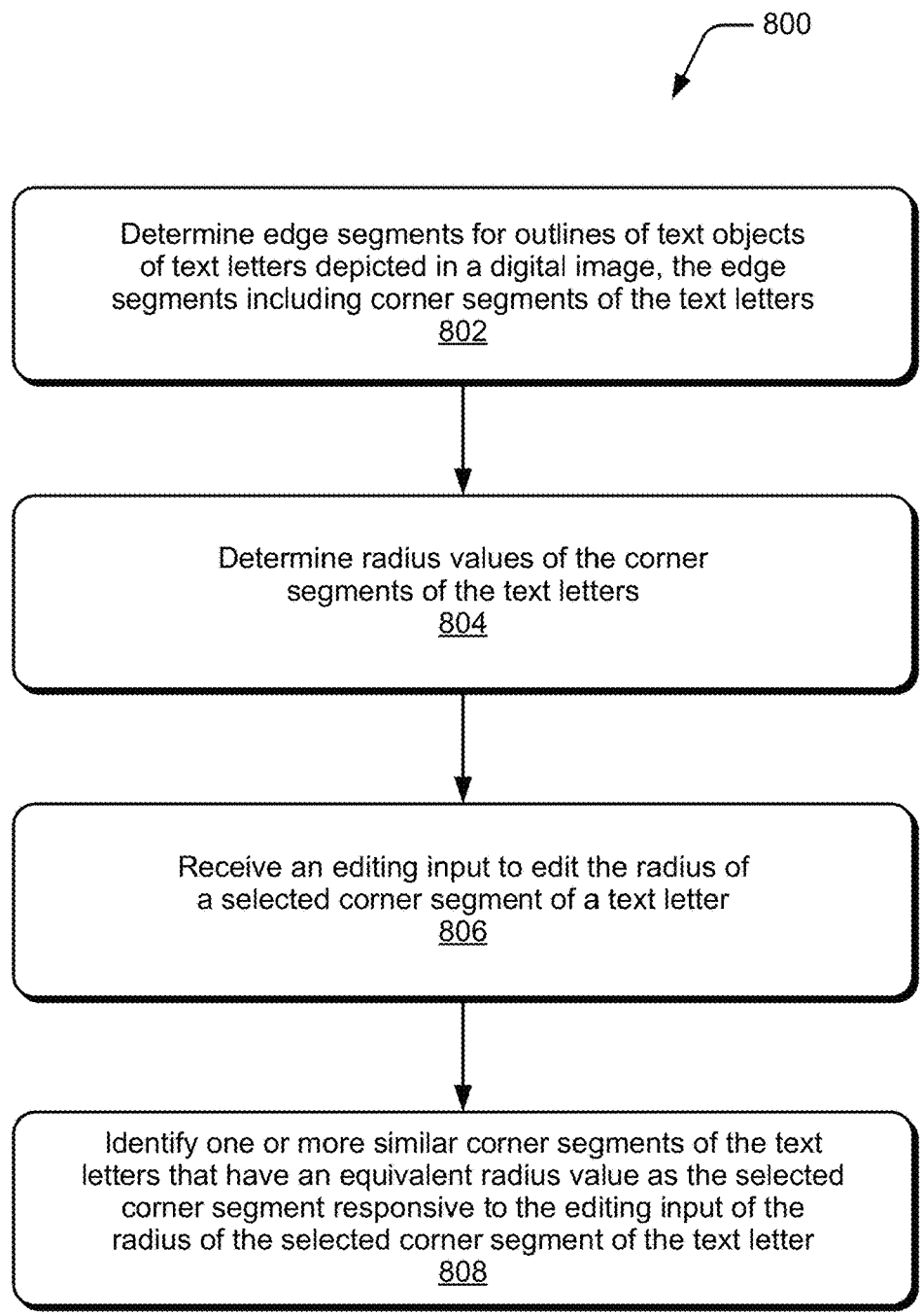
FIG. 8 illustrates example methods of free form radius editing in accordance with one or more implementations.

FIG. 8 illustrates example method(s) 800 for free form radius editing, and is generally described with reference to the radius editing system implemented by a computing device as shown and described with reference to FIGS. 1-6. The order in which the method is described is not intended to be construed as a limitation, and any number or combination of the method operations can be combined in any order to implement a method, or an alternate method.

At 802, edge segments are determined for outlines of text objects of text letters depicted in a digital image, the edge segments including corner segments of the text letters. For example, the edge detection module 124 implemented in the radius editing system 104 determines the edge segments for the outlines of the text objects 402 depicted as the text letters in the digital image 106. The edge segments also include the corner segments of the outline boundaries of the text objects 402, and the edge detection module 124 determines and identifies the corner segments. The edge detection module 124 can also approximate the rounded corner segments of the image objects 108 depicted in the digital image 106 for the corner segments that are not actual rounded corners.

At 804, radius values of the corner segments of the text letters are determined. For example, the corner detection module 126 implemented in the radius editing system 104 determines the corner radius values of each of the corner segments of the text objects 402 depicted as the text letters in the digital image 106. The cache 136 maintains the image objects data 134, which includes the corner segments of the text objects 402 as the text letters, each uniquely identified and corresponding to the respective text objects depicted in the digital image 106, as well as the determined corner radius values of each of the corner segments.

At 806, an editing input is received to edit the radius of a selected corner segment of a text letter. For example, the similar corner segments 412 of the text objects 402 are jointly edited to preserve the visual consistency and coherency of the text objects appearance. A user can initiate an editing input to resize the radius of a selected corner segment 404 of the text letter 406, such as with a pointing device 408 to click-select and drag a corner handle 410 that is associated with the selected corner segment. The editing input is received by radius modification module 128 of the radius editing system 104 via the user interface 122 of the image editing application 120 displayed on the display device 118 of the computing device 102.

At 808, one or more similar corner segments of the text letters that have an equivalent radius value as the selected corner segment are identified responsive to the editing input of the radius of the selected corner segment of the text letter. For example, the radius modification module 128 of the radius editing system 104 identifies the similar corner segments 412 of all the text objects 402 that have an equivalent radius value as the selected corner segment 404 from the image objects data 134 maintained in the cache 136. In implementations, the one or more similar corner segments of the text letters are identified for joint editing the radius of each of the one or more similar corner segments along with the radius of the selected corner segment of the text letter. Alternatively or in addition, the one or more similar corner segments of the text letters are identified with an enhanced visual indication that the selected corner segment has been edited to match the one or more similar corner segments of the text letters.

Figure 9:
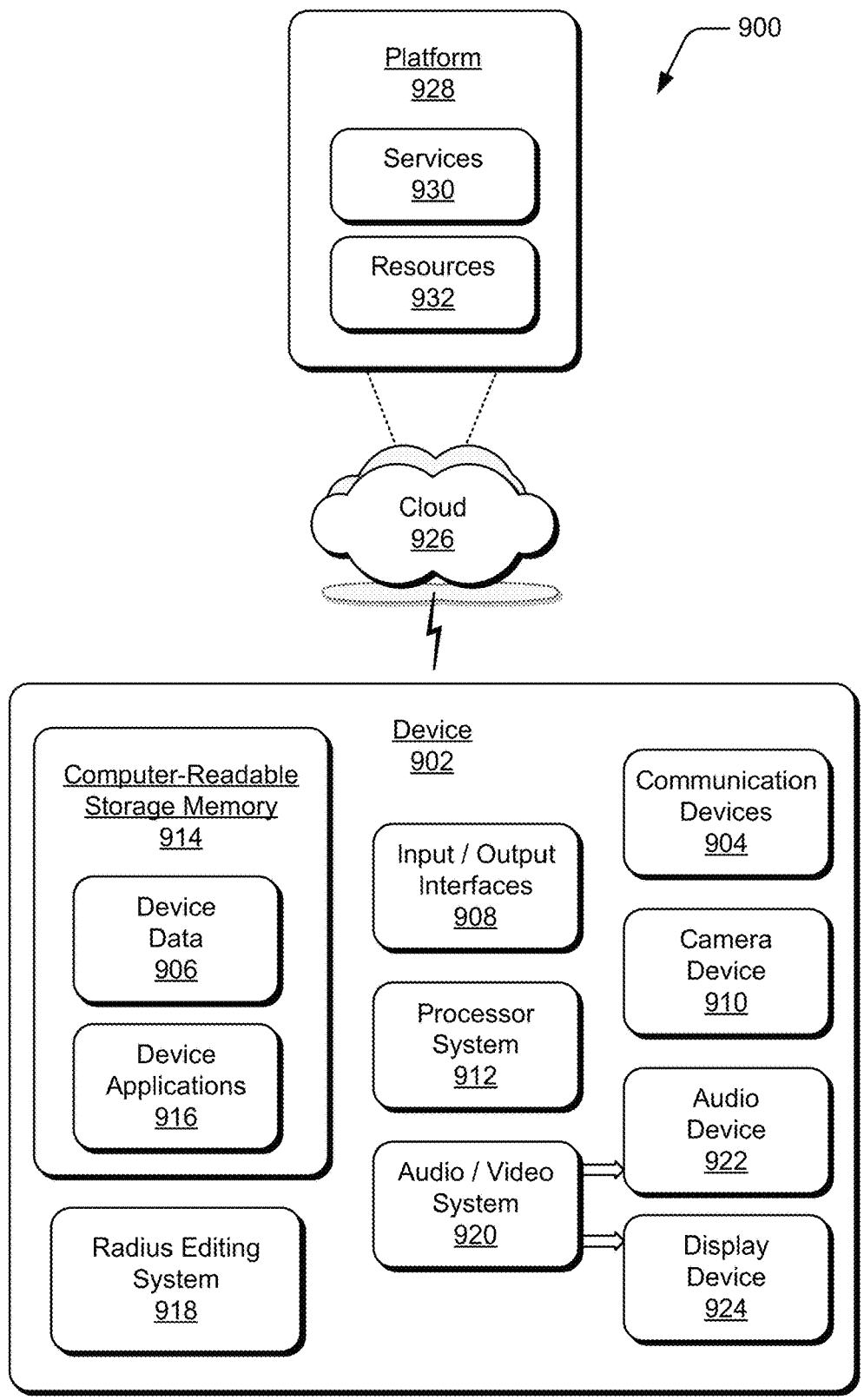
FIG. 9 illustrates an example system with an example device that can implement aspects of the techniques for free form radius editing.

FIG. 9 illustrates an example system 900 that includes an example device 902, which can implement techniques of free form radius editing. The example device 902 can be implemented as any of the computing devices, mobile devices, server devices, and/or services described with reference to the previous FIGS. 1-8, such as any type of computing device, client device, mobile phone, tablet, communication, entertainment, gaming, media playback, and/or other type of device. For example, the radius editing system 104 can be implemented by the example device 902.

The example device 902 includes communication devices 904 that enable wired and/or wireless communication of device data 906, such as any of the image object content, digital images, and/or any other of the radius editing system data, as well as computer applications data and content that is transferred from one computing device to another, and/or synched between multiple computing devices. The device data 906 can include any type of audio, video, image, and/or graphic data that is received and/or generated by applications executing on the device. The communication devices 904 can also include transceivers for cellular phone communication and/or for network data communication.

The device 902 also includes input/output (I/O) interfaces 908, such as data network interfaces that provide connection and/or communication links between the device, data networks, and other devices. The I/O interfaces can be used to couple the device to any type of components, peripherals, and/or accessory devices, such as a digital camera device 910 and/or computer input device that may be integrated with the example device 902. The I/O interfaces also include data input ports via which any type of data, media content, and/or inputs can be received, such as user inputs to the device, as well as any type of audio, video, and/or image data received from any content and/or data source.

The device 902 includes a processor system 912 that may be implemented at least partially in hardware, such as with any type of microprocessors, controllers, and the like that process executable instructions. The processor system 912 can include components of an integrated circuit, programmable logic device, a logic device formed using one or more semiconductors, and other implementations in silicon and/or hardware, such as a processor and memory system implemented as a system-on-chip (SoC). Alternatively or in addition, the device 902 can be implemented with any one or combination of software, hardware, firmware, or fixed logic circuitry that may be implemented with processing and control circuits. The device 902 may further include any type of a system bus or other data and command transfer system that couples the various components within the device. A system bus can include any one or combination of different bus structures and architectures, as well as control and data lines.

The example device 902 also includes computer-readable storage memory 914, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 914 can include various implementations of random access memory (RAM), read-only memory (ROM), flash memory, and other types of storage memory in various memory device configurations.

The computer-readable storage memory 914 provides storage of the device data 906 and various device applications 916, such as an operating system that is maintained as a software application with the computer-readable storage memory and executed by the processor system 912. In this example, the device 902 includes a radius editing system 918 that implements the described techniques of free form radius editing. The radius editing system 918 may be implemented with hardware components and/or in software as one of the device applications 916, such as when the radius editing system is implemented by the example device 902. An example of the radius editing system 918 includes the radius editing system 104, which can be implemented with various components, such as models, systems, algorithms, and/or networks. In implementations, the radius editing system 918 may include independent processing, memory, and logic components as a computing and/or electronic device integrated with the device 902.

In implementations, the radius editing system 918 and/or any of the components of the radius editing system can be implemented as any type of machine learning or neural network with trained classifiers, such as in software and/or in hardware in any type of computing device. The machine learning can be implemented by the device 902 as any type of a neural network or machine learning model, referring to a computer representation that can be tuned or trained based on inputs to approximate unknown functions. In particular, the term "machine learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, and the like. Thus, a machine-learning model makes high-level abstractions in data by generating data-driven predictions or decisions from the known input data.

The device 902 also includes an audio and/or video system 920 that generates audio data for an audio device 922 and/or generates display data for a display device 924. The audio device and/or the display device include any devices that process, display, and/or otherwise render audio, video, display, and/or image data. In implementations, the audio device and/or the display device are integrated components of the example device 902. Alternatively, the audio device and/or the display device are external, peripheral components to the example device. In embodiments, at least part of the techniques described for free form radius editing may be implemented in a distributed system, such as over a "cloud" 926 in a platform 928. The cloud 926 includes and/or is representative of the platform 928 for services 930 and/or resources 932.

The platform 928 abstracts underlying functionality of hardware, such as server devices (e.g., included in the services 930) and/or software resources (e.g., included as the resources 932), and connects the example device 902 with other devices, servers, etc. The resources 932 may also include applications and/or data that can be utilized while computer processing is executed on servers that are remote from the example device 902. Additionally, the services 930 and/or the resources 932 may facilitate subscriber network services, such as over the Internet, a cellular network, or Wi-Fi network. The platform 928 may also serve to abstract and scale resources to service a demand for the resources 932 that are implemented via the platform, such as in an interconnected device embodiment with functionality distributed throughout the system 900. For example, the functionality may be implemented in part at the example device 902 as well as via the platform 928 that abstracts the functionality of the cloud 926.

Although implementations of free form radius editing have been described in language specific to features and/or methods, the appended claims are not necessarily limited to the specific features or methods described. Rather, the specific features and methods are disclosed as example implementations of free form radius editing, and other equivalent features and methods are intended to be within the scope of the appended claims. Further, various different examples are described and it is to be appreciated that each described example can be implemented independently or in connection with one or more other described examples, such as the following:

A computing device implemented for free form radius editing, the computing device comprising: a memory to maintain a digital image and a cache of object data corresponding to edge segments for outlines of image objects depicted in the digital image; a radius editing system implemented at least partially in computer hardware, the radius editing system including: an edge detection module to determine the edge segments for the outlines of the image objects depicted in the digital image, the edge segments including corner segments of the image objects; a corner detection module to determine radius values of the corner segments of the image objects, the radius values stored as at least part of the object data in the cache; and a radius modification module to identify one or more similar corner segments of the image objects that have an equivalent radius value as a selected corner segment responsive to an editing input of a radius of the selected corner segment of an image object.

Alternatively or in addition to the above described computing device, any one or combination of: the radius editing system is integrated with an image editing application; and a user interface of the image editing application is configured to display the digital image and receive the editing input to edit the radius of the selected corner segment of the image object. The corner detection module is configured to approximate one or more of the corner segments based on path segments of the image object, the approximation of a corner segment including to calculate a piecewise curvature from sample points on the path segments to define a curvature function of the corner segment. The radius modification module is configured to initiate an enhanced visual indication of the one or more similar corner segments identified as having the equivalent radius value as the selected corner segment responsive to the editing input. The radius modification module is configured to initiate jointly editing the radius of each of the one or more similar corner segments along with the radius of the selected corner segment responsive to the editing input. The radius modification module is configured to initiate snapping the radius of the selected corner segment to the equivalent radius value of the one or more similar corner segments responsive to the editing input. Responsive to the editing input, the radius modification module is configured to: initiate an enhanced visual indication of the one or more similar corner segments identified as having the equivalent radius value as the selected corner segment; and initiate jointly editing the radius of each of the one or more similar corner segments along with the radius of the selected corner segment. Responsive to the editing input, the radius modification module is configured to: initiate snapping the radius of the selected corner segment to the equivalent radius value of the one or more similar corner segments; and initiate an enhanced visual indication of the one or more similar corner segments identified as having the equivalent radius value as the selected corner segment. The image objects are text objects of text letters; the edge detection module is configured to determine the edge segments for the outlines of the text letters; the corner detection module is configured to determine the radius values of the corner segments of the text letters; and the radius modification module is configured to identify the one or more similar corner segments of the text letters that have the equivalent radius value as the selected corner segment responsive to the editing input of the radius of the selected corner segment. The radius modification module is configured to at least one of: identify the one or more similar corner segments of the text letters for joint editing the radius of each of the one or more similar corner segments along with the radius of the selected corner segment; or identify the one or more similar corner segments of the text letters with an enhanced visual indication that the selected corner segment has been edited to match the one or more similar corner segments of the text letters.

A method implemented by a computing device in a digital medium environment for free form radius editing, the method comprising: determining edge segments for outlines of image objects depicted in a digital image, the edge segments including corner segments of the image objects; determining radius values of the corner segments of the image objects; maintaining the radius values of the corner segments in a cache as at least part of object data corresponding to the image objects depicted in the digital image; and identifying one or more similar corner segments of the image objects that have an equivalent radius value as a selected corner segment responsive to an editing input of a radius of the selected corner segment of an image object.

Alternatively or in addition to the above described method, any one or combination of: approximating one or more of the corner segments based on path segments of the image object, the approximation of a corner segment including calculating a piecewise curvature from sample points on the path segments to define a curvature function of the corner segment. Displaying an enhanced visual indication of the one or more similar corner segments identified as having the equivalent radius value as the selected corner segment responsive to the editing input. Editing the radius of each of the one or more similar corner segments along with the radius of the selected corner segment responsive to the editing input. Snapping the radius of the selected corner segment to the equivalent radius value of the one or more similar corner segments responsive to the editing input. Displaying an enhanced visual indication of the one or more similar corner segments identified as having the equivalent radius value as the selected corner segment responsive to the editing input; and editing the radius of each of the one or more similar corner segments along with the radius of the selected corner segment responsive to the editing input. Snapping the radius of the selected corner segment to the equivalent radius value of the one or more similar corner segments responsive to the editing input; and displaying an enhanced visual indication of the one or more similar corner segments responsive to the snapping the radius of the selected corner segment to the equivalent radius value of the one or more similar corner segments. The image objects are text objects of text letters; the edge segments for the outlines of the text letters are determined; the radius values of the corner segments of the text letters are determined; and the one or more similar corner segments of the text letters that have the equivalent radius value as the selected corner segment are identified responsive to the editing input of the radius of the selected corner segment.

A method implemented by a computing device in a digital medium environment for free form radius editing, the method comprising: determining edge segments for outlines of text objects of text letters depicted in a digital image, the edge segments including corner segments of the text letters; determining radius values of the corner segments of the text letters; receiving an editing input to edit the radius of a selected corner segment of a text letter; and identifying one or more similar corner segments of the text letters that have an equivalent radius value as the selected corner segment responsive to the editing input of the radius of the selected corner segment of the text letter.

Alternatively or in addition to the above described method, any one or combination of: the one or more similar corner segments of the text letters are at least one of identified for joint editing the radius of each of the one or more similar corner segments along with the radius of the selected corner segment of the text letter; or with an enhanced visual indication that the selected corner segment has been edited to match the one or more similar corner segments of the text letters.

The invention claimed is:

1. A computing device comprising:
a memory to maintain a digital image and a cache of object data corresponding to edge segments for outlines of image objects depicted in the digital image; and
a radius editing system configured to:
determine the edge segments for the outlines of the image objects depicted in the digital image by identifying path vectors that represent the outlines of the image objects, the edge segments including corner segments of the image objects;
determine radius values of the corner segments of the image objects based on the path vectors, the radius values stored as at least part of the object data in the cache;
receive an editing input identifying an edit to a radius value of a selected corner segment of the image objects;
identify one or more similar corner segments of the image objects that have an equivalent radius value as the selected corner segment based on the object data in the cache; and
responsive to the editing input, simultaneously resize the one or more similar corner segments by applying the edit to the radius value of the selected corner segment and the equivalent radius value of the one or more similar corner segments.

2. The computing device of claim 1, wherein:
the radius editing system is integrated with an image editing application; and
a user interface of the image editing application is configured to display the digital image and receive the editing input to edit the radius value of the selected corner segment of the image objects.

3. The computing device of claim 1, wherein the radius editing system is configured to approximate one or more of the corner segments based on path segments of the image objects by calculating a piecewise curvature from sample points on the path segments to define a curvature function of the selected corner segment.

4. The computing device of claim 1, wherein the radius editing system is configured to initiate an enhanced visual indication of the one or more similar corner segments identified as having the equivalent radius value as the selected corner segment responsive to the editing input.

5. The computing device of claim 1, wherein the radius editing system is configured to initiate snapping the radius value of the selected corner segment to the equivalent radius value of the one or more similar corner segments responsive to the editing input.

6. The computing device of claim 1, wherein, responsive to the editing input, the radius editing system is configured to initiate an enhanced visual indication of the one or more similar corner segments identified as having the equivalent radius value as the selected corner segment.

7. The computing device of claim 1, wherein, responsive to the editing input, the radius editing system is configured to:
initiate snapping the radius value of the selected corner segment to the equivalent radius value of the one or more similar corner segments; and
initiate an enhanced visual indication of the one or more similar corner segments identified as having the equivalent radius value as the selected corner segment.

8. The computing device of claim 1, wherein:
the image objects are text objects of text letters; and
the radius editing system is configured to:
determine the edge segments for the outlines of the text letters;
determine the radius values of the corner segments of the text letters; and
identify the one or more similar corner segments of the text letters that have the equivalent radius value as the selected corner segment responsive to the editing input of the radius value of the selected corner segment.

9. The computing device of claim 8, wherein the radius editing system is configured to at least one of:
identify the one or more similar corner segments of the text letters for joint editing the radius value of each of the one or more similar corner segments along with the radius value of the selected corner segment; or
identify the one or more similar corner segments of the text letters with an enhanced visual indication that the selected corner segment has been edited to match the one or more similar corner segments of the text letters.

10. A method comprising:
determining, by a processing device, edge segments for outlines of image objects depicted in a digital image by identifying path vectors that represent the outlines of the image objects, the edge segments including corner segments of the image objects;
determining, by the processing device, radius values of the corner segments of the image objects based on the path vectors;
receiving, by the processing device, an editing input identifying an edit to a radius value of a selected corner segment of the image objects;

maintaining, by the processing device, the radius values of the corner segments in a cache as at least part of object data corresponding to the image objects depicted in the digital image;

identifying, by the processing device, one or more similar corner segments of the image objects that have an equivalent radius value as the selected corner segment based on the object data in the cache; and responsive to the editing input, simultaneously resize the one or more similar corner segments by applying, by the processing device, the edit to the radius value of the selected corner segment and the equivalent radius value of the one or more similar corner segments.

11. The method of claim 10, further comprising:
approximating one or more of the corner segments based on path segments of the image objects by calculating a piecewise curvature from sample points on the path segments to define a curvature function of the selected corner segment.

12. The method of claim 10, further comprising:
displaying an enhanced visual indication of the one or more similar corner segments identified as having the equivalent radius value as the selected corner segment responsive to the editing input.

13. The method of claim 10, further comprising:
displaying an enhanced visual indication of the one or more similar corner segments identified as having the equivalent radius value as the selected corner segment responsive to the editing input; and editing the radius value of each of the one or more similar corner segments along with the radius value of the selected corner segment responsive to the editing input.

14. The method of claim 10, further comprising:
snapping the radius value of the selected corner segment to the equivalent radius value of the one or more similar corner segments responsive to the editing input and displaying an enhanced visual indication of the one or more similar corner segments.

15. The method of claim 10, wherein:
the image objects are text objects of text letters;
the edge segments for the outlines of the text letters are determined;
the radius values of the corner segments of the text letters are determined; and
the one or more similar corner segments of the text letters that have the equivalent radius value as the selected corner segment are identified responsive to the editing input of the radius value of the selected corner segment.

16. A method comprising:
determining edge segments for outlines of text objects of text letters depicted in a digital image by identifying path vectors that represent the outlines of the text objects, the edge segments including corner segments of the text letters;

receiving an editing input to edit a radius value of a selected corner segment of a text letter;

identifying one or more similar corner segments of the text letters that have an equivalent radius value as the selected corner segment responsive to the editing input of the radius value of the selected corner segment of the text letter based on the path vectors; and responsive to the editing input, simultaneously resize the one or more similar corner segments by applying the editing input to the radius value of the selected corner segment and the equivalent radius value of the one or more similar corner segments.

17. The method of claim 16, wherein the one or more similar corner segments of the text letters are at least one of identified:
for joint editing the radius value of each of the one or more similar corner segments along with the radius value of the selected corner segment of the text letter; or
with an enhanced visual indication that the selected corner segment has been edited to match the one or more similar corner segments of the text letters.

18. The computing device of claim 4, wherein the enhanced visual indication includes highlighting the one or more similar corner segments identified as having the equivalent radius value as the selected corner segment responsive to the editing input.

19. The method of claim 16, further comprising snapping the radius value of the selected corner segment to the equivalent radius value of the one or more similar corner segments responsive to the editing input.

20. The computing device of claim 1, wherein the cache indicates corner tolerances for the radius values of the corner segments, and the radius editing system is configured to resize the one or more similar corner segments based on the corner tolerances.

* * * * *